United States Patent [19]
Ashburner

[11] 3,943,311
[45] Mar. 9, 1976

[54] MICRO-SWITCH OPERATED WEB OR SHEET FEEDING APPARATUS

[75] Inventor: Adi Kaikhushiroo Ashburner, Hargrave, England

[73] Assignee: Harper & Tunstall Limited, Wellingborough, United Kingdom

[22] Filed: May 28, 1974

[21] Appl. No.: 473,599

[30] Foreign Application Priority Data
May 29, 1973 United Kingdom............ 25524/73

[52] U.S. Cl. ....... 200/61.13; 200/61.18; 200/61.41; 271/34
[51] Int. Cl.² ..................... B65H 25/14; H01H 3/16
[58] Field of Search........... 200/61.13, 61.14, 61.18, 200/61.41, 61.42; 226/45, 100, 170; 222/408, 415; 271/34, 67, 69, 198, 199, 7

[56] References Cited
UNITED STATES PATENTS

| | | | |
|---|---|---|---|
| 2,444,170 | 6/1948 | Sabel et al. .................. | 200/61.13 X |
| 3,027,075 | 3/1962 | Howdle et al.................. | 200/61.41 |
| 3,108,801 | 10/1963 | Van Dalen...................... | 271/34 X |
| 3,159,277 | 12/1964 | Carlson et al.................. | 226/45 X |
| 3,202,778 | 8/1965 | Fliegner et al.................. | 200/61.41 |
| 3,424,879 | 1/1969 | Shlesinger, Jr.................. | 200/61.14 |
| 3,625,508 | 12/1971 | Shiragai.............................. | 271/34 |

Primary Examiner—James R. Scott
Attorney, Agent, or Firm—Woodhams, Blanchard and Flynn

[57] ABSTRACT

The web or sheet feeding apparatus of a reprographic machine consists of first and second sets of endless bands respectively trained over co-operating pairs of driven and driving rollers. These rollers are arranged so that adjacent reaches of the bands of the two sets extend parallel to each other to define a passageway along which web or sheets are fed by the moving bands. One or more micro-switches controlling the operation of the apparatus are mounted between adjacent passage-defining reaches of bands of the first set and have actuating arms which extend into the passageway for actuation by the web or sheets. To accommodate these actuating arms, the passage-defining reaches of the bands of the second set adjacent the micro-switches are passed below spindles so as to deflect these reaches away from the micro-switches. The passage-defining reaches of the other bands of the second set pass between the spindles and the adjacent reaches of the bands of the first set and so are not deflected.

6 Claims, 2 Drawing Figures

U.S. Patent   March 9, 1976   3,943,311
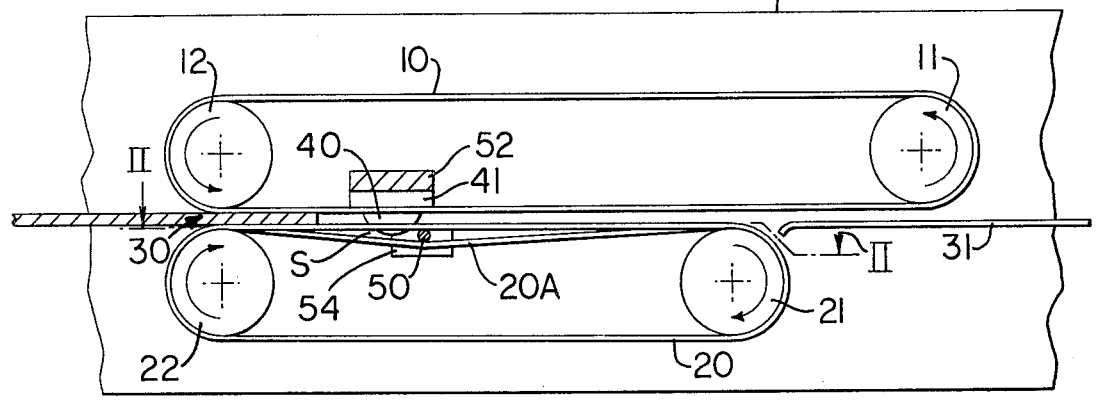
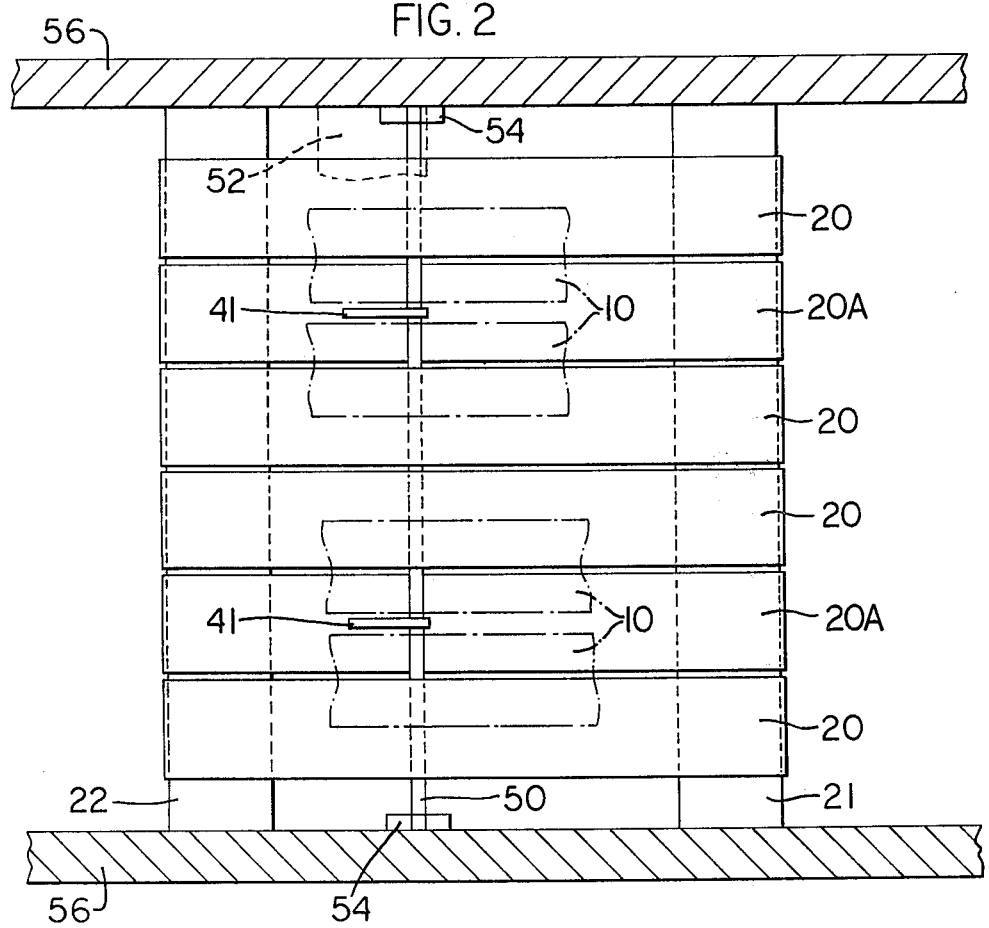

MICRO-SWITCH OPERATED WEB OR SHEET FEEDING APPARATUS

BACKGROUND OF THE INVENTION

The invention relates to a micro-switch operated web or sheet feeding apparatus, and is of particular application in reprographic apparatus in which the passage of web or sheet material through a feeding apparatus is to be monitored by one or more micro-switches.

In a diazo copying machine in which a master sheet to be copied is passed through a feeding apparatus into overlying abutment with a sheet of photo-sensitive paper, and the passage of the master sheet is monitored so as to initiate the feed of this photo-sensitive paper, or to cut the trailing edge of the photo-sensitive paper, two sets of endless bands are respectively trained around co-operating pairs of driven and driving rollers so that the opposed reaches of the band in each set move in the same direction and define a passageway for conveying the master sheet. To monitor the passage of the master sheet, photocells are often used. These are arranged so that a beam of light from a light source passes through the gap between adjacent bands of the first and second sets so as to impinge upon a light sensor whenever there is no master sheet disposed in the beam of light. However, this arrangement suffers from the disadvantages that:

a. the materials passing through the passageway defined by the bands are themselves of varying translucence, b. there is intense light already coming in from lamps in the machine. Thus, the photocells have to be adjusted to a high degree of sensitivity and this tends to make sensing unreliable.

In an alternative arrangement, for more positive operation, micro-switches are arranged so that their actuating members are disposed in gaps between adjacent bands of the two sets of endless bands so as to extend across the passageway for the master sheet. However, in view of the close spacing between the adjacent bands in each set, it is quite possible for the micro-switch to be actuated by engagement of the actuating member of the micro-switch by one of the edges of the adjacent bands. Moreover, when the actuating member has been deflected due to the passage of a master sheet through the passageway between the opposed reaches of the band, it is quite common for the actuating member to be displaced laterally so that when the master sheet has passed below the micro-switch the actuating member comes to rest on top of one of the bands adjacent the micro-switch.

SUMMARY OF THE INVENTION

It is an object of the present invention to provide apparatus in which micro-switches may be used to monitor the passage of web material passing through a web or sheet feeding apparatus.

According to the invention there is provided a micro-switch operated web or sheet feeding apparatus comprising first and second sets of endless bands respectively trained around co-operating pairs of driven and driving rollers so that the opposed reaches of the bands in each set move in the same direction and define a passageway for conveying web material between the bands, a deflector for deflecting the reach of at least one of the bands of the second set defining the passageway away from the bands of the first set, and a micro-switch mounted between adjacent bands of the first set so that an actuating member of the micro-switch is disposed in the space between the or each deflected reach of the bands of the second set and the opposed reaches of the bands of the first set.

In a preferred construction, the deflector comprises a spindle which extends across the bands of the second set below the undeflected reaches bounding the passageway, but above the or each deflected reach so as to provide space for the actuating member of the micro-switch disposed in this position.

DESCRIPTION OF THE DRAWINGS

An embodiment of the invention is hereinafter described, by way of example only, with reference to the accompanying drawing, in which:

FIG. 1 is an end elevation of an apparatus for feeding master sheets into a reprographic machine; and FIG. 2 is a sectional plan view of the apparatus shown in FIG. 1, taken across the section II—II in FIG. 1.

DESCRIPTION OF A PREFERRED EMBODIMENT

As shown in the drawing, upper endless bands 10 are trained around a driving roller 11 and an idling roller 12. Similarly, lower endless belts 20 and 20A are trained around driving and driven rollers 21 and 22.

Because the rollers 11, 12, 21 and 22 rotate in the directions indicated by the arrows, the adjacent reaches of the bands 10 and 20 define a passageway 30 for feeding a master sheet to be copied from left to right and, in traveling through the passageway 30, the master sheet M deflects the actuating elements, or members, 40 of micro-switches 41. When the master sheet has travelled through the passageway 30, it is fed onto a plate 31 from which it is fed, together with a layer of photo-sensitive paper into the reprographic processing part of the apparatus (not shown).

As shown in FIG. 2, the micro-switches 41 may be fixedly supported by a conventional support 52 on existing machine frame walls 56 and are disposed between adjacent edges of the lower reaches of the bands 10 (only four of which are indicated), and the actuating elements 40 of these micro-switches 41 extend across the passageway 30 so as to depend into the spaces S formed between the lower reaches of the upper bands 10 and the upper reaches of the lower bands 20A. These spaces S are provided by threading a deflector spindle 50 below the upper reaches of the bands 20 and above the upper reaches of the bands 20A, as shown in FIG. 1. The deflector spindle 50 may be fixed by conventional supports 54 on existing machine frame walls 56.

It is to be understood that further micro-switches and deflector spindles may be disposed upstream or downstream of the positions shown in FIGS. 1 and 2, and may be arranged so as to monitor the leading or trailing edges of the master sheet. Each micro-switch 41 and corresponding deflector spindle 50 may be adjustably movable longitudinally of the web or sheet feeding apparatus by any conventional means, for example, by longitudinal adjustment of supports 52 and 54 longitudinally on the existing machine frame walls 56.

Having described my invention, I claim:

1. A micro-switch operated apparatus for feeding web material, including webs and sheets, comprising first and second sets of endless bands respectively trained around co-operating pairs of driven and driving rollers, the opposed reaches of the bands in each set being movable in the same direction and defining a passageway for conveying web material between the bands, a deflector fixedly located with respect to the rotative axes of said rollers and disposed in said passageway, said deflector engaging and deflecting the passageway defining reach of at least one of the bands of the second set away from the bands of the first set, and a micro-switch mounted fixedly with respect to said roller axes and located laterally between adjacent bands of the first set with an actuating member of the micro-switch disposed in the space between the deflected reach of the bands of the second set and the opposed reaches of the bands of the first set.

2. Apparatus according to claim 1, including a further deflector longitudinally displaced from said first mentioned deflector for deflecting the passageway defining reach of at least one of the bands of the second set away from the bands of the first set, and a further microswitch mounted fixedly with respect to said roller axes and located laterally between adjacent bands of the first set and having an actuating member accommodated in the further space provided by the further deflector between the reach of said band of the second set and the opposed reaches of the bands of the first set.

3. Apparatus according to claim 1, including frame means rotatably supporting said rollers and in which the deflector comprises a spindle carried by said frame means and which extends transversely beyond and across the bands of the first set between and substantially parallel to said rollers below the undeflected reaches bounding the passageway, but above each reach deflected thereby.

4. Apparatus according to claim 3, in which the spindle extends above and deflects away from said passageway the passageway defining reaches of at least two laterally spaced bands of the second set but is below remaining passageway defining reaches of the second band set and thereby provides spaces to accommodate the actuating members of at least two correspondingly laterally spaced microswitches.

5. Apparatus according to claim 1, including means supporting the deflector and the associated micro-switch for adjustive movement longitudinally of the apparatus.

6. Apparatus according to claim 1, in which bands of the first and second sets are laterally offset, two adjacent bands of the first set being laterally gapped to admit the actuating member of the micro-switch between passageway defining reaches thereof and into facing relation with the passageway defining reach of an opposed band of the second set, said deflector comprising a spindle extending laterally across the bands in fixed relation to the rotative axes of said rollers and deflecting said reach of said opposed band away from said passageway sufficiently to prevent its contact with the actuating member of the micro-switch, whereby the micro-switch actuating member is engaged by and responds to the web material moving in said passageway therepast and not said opposed band.

* * * * *